United States Patent [19]

Benedyk et al.

[11] 4,118,530
[45] Oct. 3, 1978

[54] PILE PRODUCT MOLDED OF ETHYLENE/VINYL ACETATE COPOLYMER

[75] Inventors: Joseph C. Benedyk, Highland Park, Ill.; Richard O. Stratton, DeLand, Fla.

[73] Assignee: Brunswick Corporation, Skokie, Ill.

[21] Appl. No.: 876,750

[22] Filed: Feb. 10, 1978

Related U.S. Application Data

[60] Continuation of Ser. No. 733,691, Oct. 19, 1976, abandoned, which is a division of Ser. No. 531,190, Dec. 9, 1974, abandoned.

[51] Int. Cl.² ............................................. B32B 33/00
[52] U.S. Cl. ...................................... 428/92; 428/95; 428/97
[58] Field of Search .................. 428/85, 92, 95, 97

[56] References Cited

U.S. PATENT DOCUMENTS

| | | | |
|---|---|---|---|
| 3,390,403 | 6/1968 | Van Tilberg | 428/97 |
| 3,600,260 | 8/1971 | Watanabe | 428/85 |
| 3,987,228 | 10/1976 | Hemmings | 428/97 |

Primary Examiner—Marion E. McCamish
Attorney, Agent, or Firm—John G. Heimovics

[57] ABSTRACT

A pile product defined by a plurality of fibers which may extend from a base, the fibers being formed of a polymeric material of at least 90% by weight ethylene vinyl acetate copolymer (EVA). The pile product is formed by molding the heat softened copolymer in a mold defined by a plurality of small cross section, elongated cavities having a relatively large aspect ratio. Upon completion of the molding operation, the fibers are cooled and withdrawn from the mold cavities substantially without breakage or elongation of the fibers to provide an improved pile product. The withdrawn pile product may be further treated to effect cross linking of the polymeric material for further improved characteristics of the final product.

10 Claims, 5 Drawing Figures

U.S. Patent  Oct. 3, 1978  4,118,530
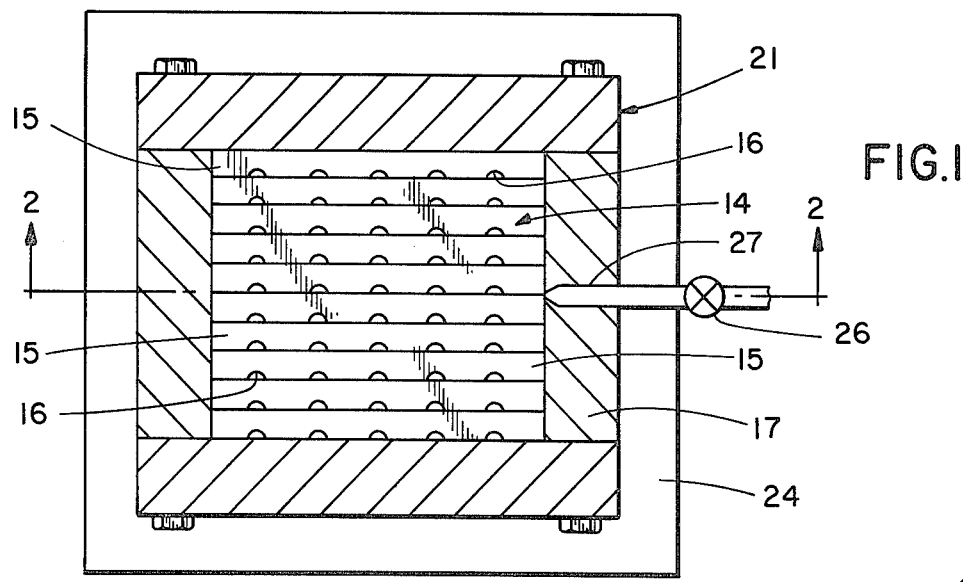
FIG.1
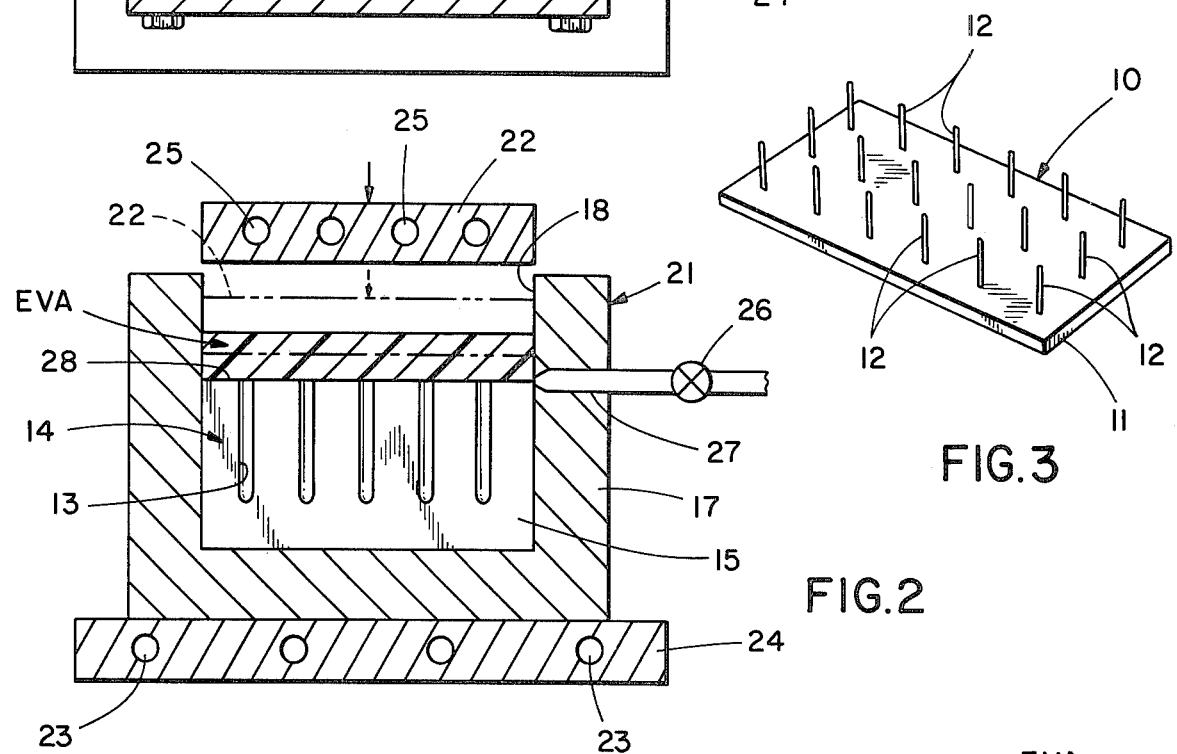
FIG.3
FIG.2
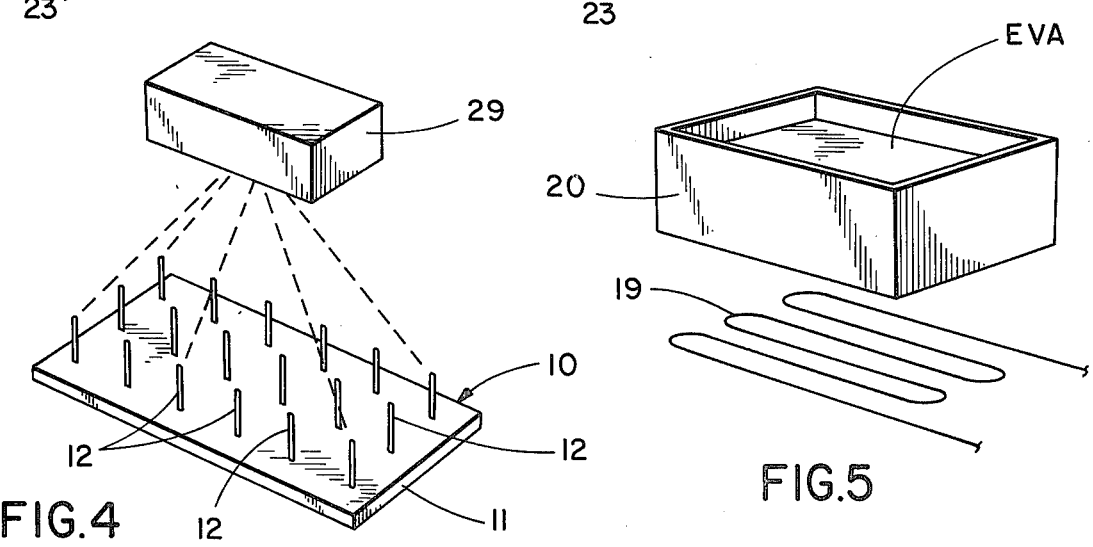
FIG.4
FIG.5

PILE PRODUCT MOLDED OF ETHYLENE/VINYL ACETATE COPOLYMER

This is a continuation of application Ser. No. 733,691, filed on Oct. 19, 1976, now abandoned, which in turn was a division of Ser. No. 531,190 filed Dec. 9, 1974, now abandoned.

BACKGROUND OF THE INVENTION

1. Field of the Invention

This invention relates to pile products and in particular to molded pile products.

2. Description of the Prior Art

As shown in Robert M. Conklin U.S. Pat. No. 3,804,617, owned by the assignee hereof, an improved synthetic resin pile product may be formed by a molding operation wherein the pile fibers extend from a base portion. The pile product may be so formed by means of a mold provided with a plurality of relatively small cross section, high aspect ratio (the ratio of the length to cross section) cavities. As indicated in said patent, the pile product may be formed of suitable polymeric material, such as polyvinyl chloride, polyethylene, polypropylene, and polyurethane.

As indicated in said Conklin patent, prior disclosures of the molding of pile products were presented in the applications of Tompkins and Moore entitled Molded Pile, filed Jan. 5, 1972, Ser. No. 215,623 and Roberts and Acciavatti entitled Process For Making Pile Materials and Pile Materials Produced Therefrom, filed Jan. 5, 1972, Ser. No. 215,557, now abandoned, and the issued U.S. Pat. Nos. 3,027,595, 3,141,051 and 3,317,633 to Unokichi Takai. As disclosed in the Takai U.S. Pat. No. 3,141,051, his suedelike material may be formed of vinyl plastic or other material, such as polyethylene, polypropylene, polyvinyl acetate, polystyrene, etc. In the Takai U.S. Pat. No. 3,317,644, he discloses the use of a polyvinyl chloride pile material.

Additional pertinent prior art would appear to be that disclosed in the U.S. Pat. Nos. 3,316,592, 3,632,842 and 3,655,497 of Norman Forrest. In U.S. Pat. No. 3,316,592, Forrest discloses forming pile material from vinyl and similar plastics. In U.S. Pat. No. 3,632,842, he discloses formation of synthetic suede from polyvinyl chloride. In U.S. Pat. No. 3,655,487, he teaches the formation of the synthetic suede from polyvinyl chloride resins or plastisols including all of the halo ethylene polymers of a certain type, listing numerous examples thereof.

One major problem with manufacturing molded pile products is to repeatedly remove the product from the mold without elongating or breaking the pile fibers. This problem becomes more acute as the pile fibers become longer and thinner. With known molding techniques it is believed impossible to repeatedly withdraw pile fibers from a mold where the aspect ratio (fiber length divided by fiber diameter) of the fiber is about 50 or greater.

SUMMARY OF THE INVENTION

We have discovered a way to mold a pile product and withdraw the molded pile product from the mold without breaking or elongating the pile fibers. According to our invention, the pile product comprises at least 90% by weight of a copolymer of ethylene and vinyl acetate (EVA). The pile fibers have an aspect ratio of greater than approximately 50, and have a maximum aspect ratio of approximately 100. Such pile fibers are further characterized by having an average diameter in the range of approximately 4 to 10 mils, an average length in the range of approximately 200 to 700 mils, and a fiber density in the range of approximately 10 to 50%. The preferred fiber diameter is 5 to 6 mils, the preferred fiber length is 200 to 300 mils, the preferred aspect ratio is 50 to 60, and the preferred pile density is 15 to 20%

*fiber density = $\dfrac{\text{volume of fibers}}{\text{fiber height times the area of the base of the pile product times 100}}$ The pile fibers may be of equal length or some fibers may be longer relative to other fibers to provide a cut pile design. Moreover, the fibers may have different cross sectional shapes or the same cross section shapes. The preferred cross sectional shapes of the fibers is circular or oval; however, other shapes may be desired for aesthetic purposes. Similarly, the fibers may be tapered or untapered.

When EVA copolymer is used to make a pile product having the above stated physical properties, the pile fibers have a plush, soft, highly desirable feel. However, EVA copolymer is used in many applications as an adhesive. Therefore, one skilled in the art of making molded pile products would ordinarily not choose EVA copolymer because of the anticipated difficulties he would expect to encounter in removing the pile product from the mold. We have discovered, however, that by carefully controlling the molding conditions, the EVA copolymer can be molded into a plush pile product which is readily removed from the mold without breaking or elongating the pile fibers.

According to our method of molding a pile product, first a mass of polymeric material including at least 90 weight percent EVA copolymer is heated to a temperature in the range of approximately 250° to 500° F., preferably, from 275° to 300° F. Next, this heated mass is subjected to a pressure in the range of approximately 200 to 1200 p.s.i., preferably 800 to 1000 p.s.i., to force the polymeric material into a mold having cavities corresponding to the fibers of the pile product. The mass of polymeric material in the mold is then cooled to a temperature in the range of approximately 140° to 170° F. When the molded pile product in the mold is cooled this temperature, it is then removed from the mold. Care is taken to only apply the pressure for a period of time less than approximately 130 seconds. Ordinarily, the time pressure must be applied to the mass of heated polymeric material ranges approximately from 30 to 130 seconds. We have found that the mass of polymeric material should include a release agent, and preferably, the mold is also precoated with a release agent. Suitable release agents are fatty acids, fatty acid salts, fatty acid amides, or fatty acid esters and compounds of silicon.

The EVA copolymer employed should have a melt index in the range of approximately 1 to 3, preferably 2 to 3. Moreover, the EVA copolymer should comprise 2 to 30 weight %, preferably 2 to 8 weight %, of the vinyl acetate moiety.

Prior to molding, the release agent is blended with the EVA copolymer to form the molding composition. Approximately 1% by weight of release agent is used. In addition to the release agent, approximately 10% by weight or less of a filler material may be added to the polymeric material. Such fillers may include pigments, carbon black, antioxidants, stabilizers, and the like.

We have found it desirable in order to improve the strength of the pile fibers to crosslink the molecules of the fibers after the pile product has been removed from the mold. This is accomplished most effectively by irradiating the pile product with an electron beam. Illustratively, the product may be irradiated with doses in the range of approximately 5 to 15 MR to effect such crosslinking when desired.

Thus, the present invention comprehends an improved pile product formed of a material heretofore contraindicated for such use, which is extremely simple and economical of manufacture while yet providing highly improved features and characteristics.

BRIEF DESCRIPTION OF THE DRAWING

Other features and advantages of the invention will be apparent from the following description taken in connection with the accompanying drawing wherein:

FIG. 1 is a schematic cross section of apparatus illustrating one step in the molding of pile product embodying the invention;

FIG. 2 is a horizontal cross section taken substantially along the line 2—2 of FIG. 1;

FIG. 3 is an isometric view of a pile product embodying the invention;

FIG. 4 is a schematic view illustrating an irradiation step for effecting crosslinking of the pile product polymeric material; and FIG. 5 is a schematic illustration showing a preheating of the polymeric material.

DESCRIPTION OF THE PREFERRED EMBODIMENT

In the exemplary embodiment of the invention as disclosed in the drawing, a pile product generally designated 10 is shown to comprise a base portion 11 and a plurality of fibers 12 upstanding from the base portion. The present invention comprehends forming product 10 of an ethylene vinyl acetate copolymer to provide improved pile product characteristics and facilitated low cost manufacture.

The EVA material may be introduced into the cavities 13 of a mold generally designated 14 to form the desired product 10. Thus, as shown in FIG. 1, cavities 13 comprise elongated, relatively small cross section cavities for molding a large number of fibers 12 so as to form a desired pile-type product 10. As best seen in FIG. 2, one type of mold 14 may be formed of a plurality of plates 15 provided with small cross section, outwardly opening recesses 16, which plates, when stacked, define a plurality of downwardly extending cavities 13. The plates may be secured in the stacked relationship by a suitable outer frame portion 17 defining an upper material receiving space 18. The copolymer material, generally designated EVA, may be preheated such as by means of a conventional heater 19 with the material received in a suitable container 20. Alternatively, the material may be placed in the heated molding apparatus generally designated 21 including frame 17 and mold 14 with the mold being heated to the desired molding temperature, such as in the range of approximately 250° to 500° F.

A pressure plate 22 may be introduced into the recess 18 to apply a pressure to the heated EVA material in the range of approximately 200 to 1200 p.s.i. and for a preselected period of time up to approximately 130 seconds. A portion of the EVA material is thus caused to flow into the cavities 13 while the remaining portion of the material is retained above the mold 14, as shown by the dotted lines in FIG. 1, thereby concurrently forming the base portion 11 and fiber portion 12 of the pile product.

As discussed above, the cavities may have a relatively high aspect ratio so that relatively fine fibers may be so formed of the selected EVA material while yet the formed fibers may be readily withdrawn from the cavities 13 upon a subsequent cooling of the molded product and lifting of the cooled product from the mold. As will be obvious to those skilled in the art, any suitable method of successively heating and cooling the mold may be utilized within the scope of the invention. One illustrative method, as shown, is to provide suitable passages 23 in a platen 24 juxtaposed to the molding apparatus 21 and selectively carrying heating and cooling fluids. Further illustratively, the pressure plate 22 may be provided with similar passages 25 to define a selective upper heating and cooling means.

The lifting of the formed pile product from the mold may be effected by injecting a compressed gas, such as nitrogen, through a suitable control valve 26 and a flow passage 27 to between the base portion 11 of the product and the upper surface 28 of the mold 14 subsequent to the cooling of the molded product to a desired lower temperature of approximately 140° to 170° F. The pressurized fluid may thusly further serve to cool the product during the removal thereof from the mold.

The molded product may be further irradiated, as shown in FIG. 4, by a conventional electron irradiation apparatus generally designated 29 to effect crosslinking of the EVA material when desired. Illustratively, the pile product may be irradiated with dosages of approximately 5 to 15 MR whereby the melt characteristics of the EVA material are substantially improved from a normal melt point of approximately 220°–225° to 350° F. and by suitably irradiating the EVA material, the material may be completely cured to prevent any melting thereof up to the char point.

As further discussed above, the invention comprehends providing a small percentage of mold release agent in the EVA copolymer. The release agent may be provided in an amount less than 1% by weight of the mold material, and as indicated above, preferably comprises a fatty acid material, one example being the fatty acid amide material marketed under the trade name Kemamide by Kraftco Corporation of Memphis, Tennessee.

For further improved release of the fibers from the mold cavities, it is desirable to provide an external release agent on the mold cavity surface, one example thereof being a silicone fluid dissolved in perchloroethylene.

It has been found that by controlling the molding temperature, the use of release agents and other parameters, as discussed above, a pile product is obtained effectively avoiding undesirable elongation or breaking of the fibers during the removal thereof from the mold and providing improved pile product characteristics in the final product.

A typical example of the formation of the desired product is one wherein the EVA copolymer was molded at a molding temperature in the range of 275° to 340° F. at a compression pressure in the range of approximately 1000 to 1200 p.s.i. for approximately 1 minute with the release cool temperature approximately 175° F. It has been found that the application of the pressure plate as a cooling plate provides an improved rapid forming of the pile product. As will be obvious to those skilled in the art, the molding operation could be formed in a heating press with the mold and molded product being transferred to a cooling press for effecting the sequential steps, if so desired.

The disclosed method of forming the EVA pile product may be utilized in connection with continuous molding operations where the mold may be successively heated and cooled as in a rotary mold device.

The resultant EVA pile product 10 exhibits high resilience, high abrasion resistance, high soil resistance, and low static electricity propensity. At present, the cost of the EVA copolymer material is approximately one-half that of conventional polyvinyl chloride materials. Further, it has been found that whereas pile fabrics formed of polyvinyl chloride fabric have an objectionable wet hand, the EVA pile product made in conformity with the present invention has a desirable dry hand feel.

As the EVA material is capable of ready pigmentation, the product may be formed in a wide range of colors which may be effectively fadeproof in contradistinction to the conventional dye colors used in conventional carpeting, thereby providing a further highly desirable advantage over the prior art materials. As the cavities 13 and resultant fibers 12 have a very small cross section, the fibers do not resist the person's foot when the product is used as a carpet so as to avoid giving the walker a feeling of reactive thrust. Thus, in vew of the improved abrasion resistance, soil resistance, resistance to static charge buildup, and stain resistance, the pile product comprises an excellent candidate for carpeting material.

The use of EVA copolymer in such pile products, as briefly indicated above, is contraindicated in view of the use of EVA copolymers extensively as hot melt adhesives inasmuch as the molding material must not adhere to the surfaces of the mold cavities while yet the fibers must have high aspect ratios making the satisfactory use of an adhesive material for this purpose unexpected.

The foregoing disclosure of specific embodiments is illustrative of the broad inventive concepts comprehended by the invention.

We claim:

1. A molded pile product comprising:
   (a) a base and a plurality of pile fibers extending upright from said base;
   (b) the fibers and base being formed from an irradiated polymer mixture comprising at least 90% by weight a copolymer of ethylene and vinyl acetate having a melt index of from 1 to 3 and not more than 1% by weight of a mold release agent;
   (c) the fibers having an average diameter in the range of approximately 4 to 10 mils, an average length in the range of approximately 200 to 700 mils, an aspect ratio in the range of approximately 50 to 100, and a fiber density in the range of approximately 10 to 50%; and
   (d) the pile product having been molded by heat and pressure in cavities corresponding to the fibers of the pile product and removed from the cavities at a temperature of 140°–170° F., the fibers exhibiting substantially no elongation or breakage in spite of removal from high aspect cavities at said elevated removal temperature.

2. The pile product of claim 1 where said copolymer of ethylene and vinyl acetate includes 2 to 30% by weight vinyl acetate.

3. The pile product of claim 1 where said copolymer of ethylene and vinyl acetate includes 2 to 8% by weight vinyl acetate.

4. The pile product of claim 1 where said mold release agent comprises a fatty acid agent.

5. The pile product of claim 1 where the fibers further include less than approximately 10% by weight of filler material.

6. The pile product of claim 1 where the fiber density is approximately 18 to 20% and the fibers have an average diameter of approximately 4 to 6 mils.

7. The pile product of claim 1 where the fibers include preselected pigment means providing preselected coloration of the product.

8. The pile product of claim 1 where the fibers have a sequentially molded and electron-irradiated microstructure.

9. The pile product of claim 8 where the microstructure comprises a crosslinked structure of said copolymer.

10. The pile product of claim 8 where the microstructure is preselected to prevent melting of the fibers at temperatures up to approximately 350° F.

* * * * *